(12) United States Patent
Kotlar

(10) Patent No.: US 11,674,421 B2
(45) Date of Patent: Jun. 13, 2023

(54) EXHAUST GAS AFTERTREATMENT SYSTEM AND METHOD FOR CONTROLLING AN EXHAUST GAS AFTERTREATMENT SYSTEM OF AN INTERNAL COMBUSTION ENGINE

(71) Applicant: Vitesco Technologies GmbH, Regensburg (DE)

(72) Inventor: Aurelian Kotlar, Timisoara (RO)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/456,076

(22) Filed: Nov. 22, 2021

(65) Prior Publication Data

US 2022/0082041 A1  Mar. 17, 2022

Related U.S. Application Data

(63) Continuation of application No. PCT/EP2020/066704, filed on Jun. 19, 2020.

(30) Foreign Application Priority Data

Jun. 19, 2019 (EP) .................................. 19465536
Jun. 26, 2019 (DE) ..................... 10 2019 209 207.1

(51) Int. Cl.
*F01N 3/00* (2006.01)
*F01N 3/20* (2006.01)
*F01N 9/00* (2006.01)

(52) U.S. Cl.
CPC ........... *F01N 3/2013* (2013.01); *F01N 9/002* (2013.01); *F01N 2240/16* (2013.01);
(Continued)

(58) Field of Classification Search
CPC .... F01N 3/2013; F01N 9/002; F01N 2240/16; F01N 2900/0602; F01N 2900/1602; F01N 2900/1626
See application file for complete search history.

(56) References Cited

U.S. PATENT DOCUMENTS 5,261,230 A   11/1993   Yuuki et al.
5,390,493 A   2/1995    Fujishita et al.
(Continued)

FOREIGN PATENT DOCUMENTS

CN   108583565 A   9/2018
DE   4421066 A1    1/1995
(Continued)

OTHER PUBLICATIONS

International Search Report and Written Opinion dated Sep. 2, 2020 from corresponding International Patent Application No. PCT/EP2020/066704.
(Continued)

*Primary Examiner* — Matthew T Largi

(57) ABSTRACT

The disclosure relates to an exhaust gas aftertreatment system for treating exhaust gas from an internal combustion engine. The exhaust gas aftertreatment system includes an exhaust gas catalyst that includes an exhaust gas catalysis portion and a heating element. The heating element is configured to heat the exhaust gas catalysis portion. The exhaust gas aftertreatment system also includes: a voltage source which supplies the heating element with electric power for heating the heating element, and a DC to DC converter which is configured to control the electric power supply from the voltage source to the heating element. The exhaust gas aftertreatment system also includes a control
(Continued)

unit which is configured to control the DC to DC converter based on the required electric power to heat the exhaust gas catalysis portion.

10 Claims, 4 Drawing Sheets

(52) U.S. Cl.
CPC .............. *F01N 2900/0602* (2013.01); *F01N 2900/1602* (2013.01); *F01N 2900/1626* (2013.01)

(56) References Cited

U.S. PATENT DOCUMENTS

| | | | |
|---|---|---|---|
| 5,555,725 A | | 9/1996 | Shimasaki et al. |
| 5,580,477 A | * | 12/1996 | Oota ..................... F01N 3/2013 |
| | | | 219/508 |
| 5,645,745 A | | 7/1997 | Hartwick et al. |
| 5,746,053 A | | 5/1998 | Hibino |
| 5,757,164 A | | 5/1998 | Yoshizaki et al. |
| 5,785,137 A | | 7/1998 | Reuyl |
| 5,966,931 A | | 10/1999 | Yoshizaki et al. |
| 6,052,988 A | | 4/2000 | Ikeda |
| 6,218,643 B1 | * | 4/2001 | Iwata ..................... F01N 3/2013 |
| | | | 219/508 |
| 10,480,370 B2 | * | 11/2019 | Romanato ............. F01N 3/2013 |
| 2005/0268596 A1 | * | 12/2005 | Abe ...................... F01N 3/2026 |
| | | | 60/277 |
| 2008/0013351 A1 | * | 1/2008 | Alexander ............ H02M 7/797 |
| | | | 363/123 |
| 2008/0247204 A1 | * | 10/2008 | Renken .................... B60L 50/51 |
| | | | 363/124 |
| 2010/0212981 A1 | | 8/2010 | Roos |
| 2012/0061449 A1 | | 3/2012 | Soutorine et al. |
| 2012/0303200 A1 | | 11/2012 | Ang |
| 2012/0323419 A1 | * | 12/2012 | Hashimoto ........... B60W 10/06 |
| | | | 903/930 |
| 2015/0035370 A1 | * | 2/2015 | Wyatt .................... B60L 58/16 |
| | | | 307/77 |
| 2015/0218995 A1 | * | 8/2015 | Hashimoto ........... F01N 3/2026 |
| | | | 60/286 |
| 2016/0185205 A1 | * | 6/2016 | Namuduri ........... F02N 11/0866 |
| | | | 180/65.23 |
| 2016/0251993 A1 | * | 9/2016 | Yoshikawa ........... F01N 3/0234 |
| | | | 60/284 |
| 2017/0305414 A1 | * | 10/2017 | Hashimoto ........... B60W 20/50 |
| 2018/0156144 A1 | * | 6/2018 | Inoue ..................... B60R 16/03 |
| 2019/0118794 A1 | * | 4/2019 | Slottskog .............. B60W 10/06 |
| 2020/0011225 A1 | | 1/2020 | Hirth |
| 2022/0105793 A1 | * | 4/2022 | Sukhatankar .......... B60K 25/06 |

FOREIGN PATENT DOCUMENTS

| | | |
|---|---|---|
| DE | 19940802 A1 | 4/2001 |
| DE | 102016224711 A1 | 6/2018 |
| JP | 2009189921 A | 8/2009 |
| JP | 2012061449 A | 3/2012 |

OTHER PUBLICATIONS

German Office Action dated Feb. 19, 2020 for corresponding German Patent Application No. PCT/EP2020/066704.

* cited by examiner

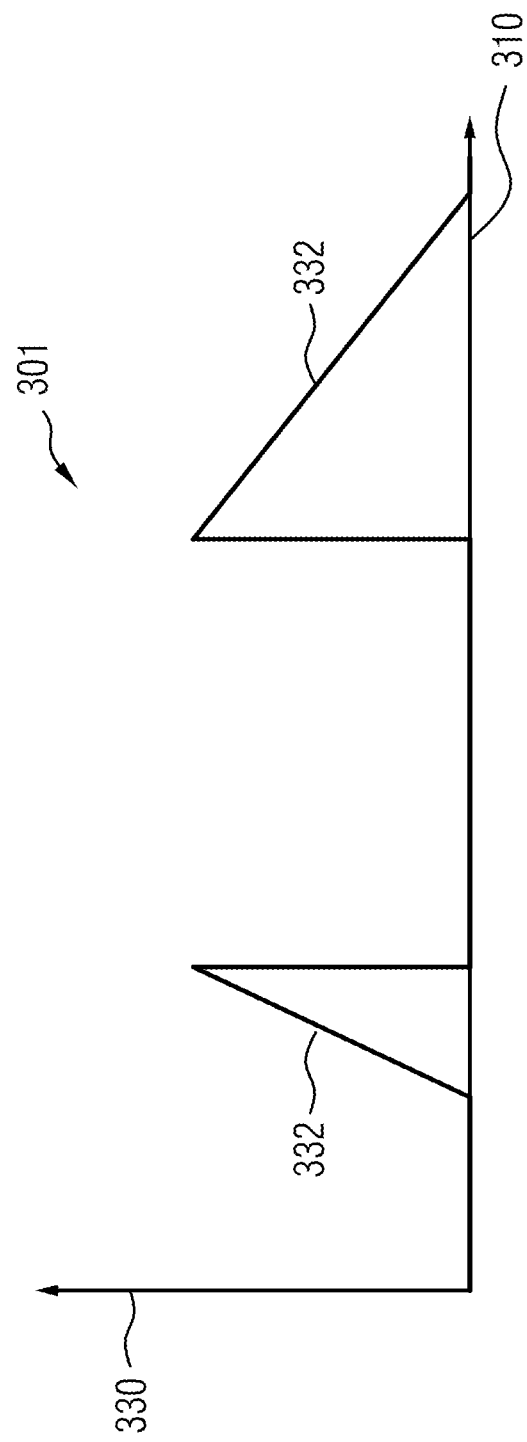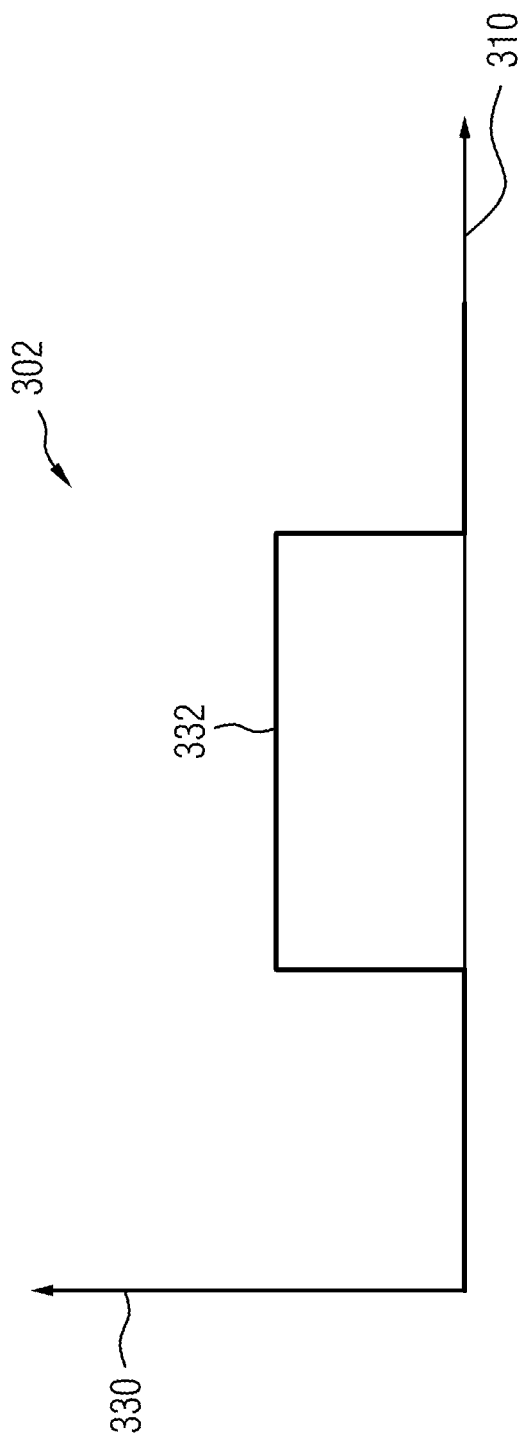

EXHAUST GAS AFTERTREATMENT SYSTEM AND METHOD FOR CONTROLLING AN EXHAUST GAS AFTERTREATMENT SYSTEM OF AN INTERNAL COMBUSTION ENGINE

CROSS-REFERENCE TO RELATED APPLICATIONS

This application claims the benefit of International Application PCT/EP2020/066704, filed Jun. 17, 2020, which claims priority to German Application 10 2019 209 207.1, filed Jun. 26, 2019 and European Application EP19465536, filed Jun. 19, 2019. The disclosures of the above applications are incorporated herein by reference.

TECHNICAL FIELD

The disclosure relates to an exhaust gas aftertreatment system for treating exhaust gas from an internal combustion engine and to a method for controlling an exhaust gas aftertreatment system of an internal combustion engine.

BACKGROUND

Exhaust gas aftertreatment systems are used in vehicles with an internal combustion engine to treat its exhaust gas to reduce emissions out of the exhaust gas of the internal combustion engine. The exhaust gas aftertreatment system includes therefore components like an exhaust gas catalyst. The exhaust gas catalyst treats, by way of a chemical oxidation or reduction, the emissions in the exhaust gas. Therefore, the exhaust gas catalyst includes an exhaust gas catalysis portion through which the exhaust gas flows and in which the chemical oxidation or reduction happens.

The required working temperature for the exhaust gas catalysis portion lies conventionally in an area above 200° C. To reach this temperature, the exhaust gas catalyst uses heat of the exhaust gas itself. This means that the first time after an internal combustion engine cold start the exhaust gas catalyst is not operating at the required temperature level. If the exhaust gas catalyst is not operating at the required temperature level, the emissions of the internal combustion engines are not reduced as required. Especially the initial emissions after a cold start of the internal combustion engine are aggravated by the fact that modern internal combustion engines have higher combustion efficiency which lead to lower exhaust gas temperatures. Lower exhaust gas temperature means a longer time for the exhaust gas catalyst to reach the operational temperature and therefore this leads to higher emissions.

For hybrid vehicles this is also a problem, because due to their nature, the internal combustion engine has an intermitted operation, which might not be sufficient to raise the temperature of the exhaust gas catalyst to its operating temperature even during the operation of the hybrid vehicle.

To cope with such issues exhaust gas catalysts are used which include a heating element. The heating element is configured to heat up the exhaust gas catalysis portion of the exhaust gas catalyst during operation of the internal combustion engine. The heating element is conventionally supplied with electric power from a voltage source. The required electric power to heat the heating element could be between 2 kW and 10 kW. Because of the high electric power requirements of the heating element most of the needed electric power is usually provided from an alternator or from a starter generator of the vehicle.

The control of the electric power supply is conventionally realized by an on/off control switch. In case the heating element is connected by the on/off switch to an electric power supply grid, it is difficult to handle sudden power consumption on the grid due to the high electric power requirements of the heating element. When the heating element is suddenly disconnected from the electric power supply grid by the on/off switch, transient pulses might appear on the electric power supply grid.

In the case of sudden connection of the heating element to the electric power supply grid and in the case of sudden disconnection of the heating element from the power supply grid the whole grid could be destabilized, or high energy pulses could appear on the grid which may possibly harm or destroy control units or other parts of the electric grid.

One known system and control module for controlling an electrically heated catalyst includes a remote start module generating a remote start signal, a catalyst control module controlling the electrically heated catalyst based on the remote start signal and an engine control module starting the engine after preheating and/or when required by the vehicle to honor a request as defined.

Another known system provides a current flow control system for use in a catalyst device heated by current flow which equipped with a catalyst device heated by current flow comprising a catalyst support that heats a supported catalyst by its temperature rise caused by its current flow characterized of changing the current flow resistance in accordance with its temperature change, first and second temperature sensors disposed on the catalyst support and a controller that controls the current flow of the catalyst support from the information coming from the first and second temperature sensors.

Yet another known system provides a device for controlling a heating of a catalyst arranged in the exhaust passage of an engine.

SUMMARY

The present disclosure provides an exhaust gas aftertreatment system and a method for controlling the exhaust gas aftertreatment system with which a reliable and safely operation of the exhaust gas aftertreatment system can be realized.

According to the present disclosure an exhaust gas aftertreatment system for treating exhaust gas from an internal combustion engine includes an exhaust gas catalyst that includes an exhaust gas catalysis portion and a heating element. The heating element is configured to heat the exhaust gas catalysis portion. The exhaust gas aftertreatment system includes a voltage source which supplies the heating element with electric power for heating the heating element. The exhaust gas aftertreatment system also includes a DC to DC converter which is configured to control the electric power supply from the voltage source to the heating element. Additionally, the exhaust gad aftertreatment system includes a control unit which is configured to control the DC to DC converter based on the required electric power to heat the exhaust gas catalysis portion.

Implementations of the disclosure may include one or more of the following optional features. In some implementations, the exhaust gas catalyst includes the exhaust gas catalysis portion and the heating element. In the exhaust gas catalysis portion the catalysis takes place to reduce the emissions in the exhaust gas. The heating element is configured to heat the exhaust gas catalysis portion. In some examples, the heating element is configured to heat the exhaust gas catalysis portion selectively during operation of the exhaust gas aftertreatment system. The heating element may be arranged upstream of the exhaust gas catalysis portion with respect to an exhaust gas flow direction through the internal combustion engine. In some examples, it is also conceivable that the heating element is in the exhaust gas flow direction arranged downstream of the exhaust gas catalysis portion. The exhaust gas catalyst may include two heating elements, where one of the two is arranged in exhaust gas flow direction upstream of the exhaust gas catalysis portion and the other one of the two is arranged in exhaust gas flow direction downstream of the exhaust gas catalysis portion. The heating element is supplied with electric power by the voltage source. The voltage source is for example a battery or a rechargeable battery. The exhaust gas catalysis portion is only then heated up to a predetermined temperature by the heating element if the exhaust gas catalysis portion has a temperature which is below a threshold temperature which is required for a sufficient exhaust gas aftertreatment. This is for example the case immediately after a cold start of the internal combustion engine. Accordingly, the exhaust gas catalysis portion does not have to be heated during the whole time of operation of the internal combustion engine by the heating element.

The heating element may include a honeycomb structure or a matrix structure. In this case, electric current flows from the voltage source through the honeycomb structure or the matrix structure. The honeycomb structure or the matrix structure work as an ohmic resistance. Because of this, the honeycomb structure or the matrix structure get heated and supply the exhaust gas catalysis portion with heat. The temperature of the heating element is therefore directly depending on the electric power supplied by the voltage source.

The DC to DC converter is an electronic circuit or electromechanical device that converts a source of direct current from one voltage level to another, it is therefore possible to control the supply of consumers with electric power with the DC to DC converter. The DC to DC converter has the advantage that it is possible to safely connect or disconnect electric consumers which require high electric power without harming the power supply grid. The DC to DC converter can thus be used to connect or disconnect the heating element with the voltage source and with the DC to DC converter the output voltage supplied to the heating element can be controlled safely. The DC to DC converter has a high efficiency level compared to a conventional on/off switch and can therefore reduce undesired heat production. With the DC to DC converter it is possible to control the electric power supply from the voltage source to the heating element safely and reliably. The power consumption of the heating element when the DC to DC converter closes the circuit so that electric power flows from the voltage source to the heating element can be controlled safely and reliably without transient pulses on the electric grid. With the DC to DC converter, which controls the electric power supply from the voltage source to the heating element, the electric grid of the exhaust gas aftertreatment system is not so easily destabilized even if the power supply from the voltage source to the heating element is constantly switching between on or off. The DC to DC converter handles such sudden connections or disconnections without harming the electric grid of the exhaust gas aftertreatment system.

The control unit is configured to control the DC to DC converter based on the required electric power to heat the exhaust gas catalysis portion. In other words, if the heating element has to heat up the exhaust gas catalysis portion, the control unit controls the DC to DC converter to supply electric power from the voltage source to the heating element to heat the exhaust gas catalysis portion. In addition, the control unit is also configured to control the DC to DC converter to disconnect the voltage source from the heating element so that no electric power flows from the voltage source to the heating element.

The control unit controls, via the DC to DC converter, the power supply from the voltage source to the heating element to control the temperature of the exhaust gas catalysis portion. With the control unit in combination with the DC to DC converter, it is possible to control the power supply from the voltage source to the heating element in such a manner that the electric grid of the exhaust gas aftertreatment system is not harmed during connection or disconnection of the heating element to the voltage source. This makes the whole exhaust gas aftertreatment system reliable and robust.

In some implementations, the DC to DC converter is a buck converter. A buck converter is a DC to DC converter which steps down voltage (via stepping up current) from its input to its output. With the buck converter it is advantageously possible to control the electric power supply from the voltage source to the heating element in such a manner that the electric grid of the exhaust gas aftertreatment system is not overloaded if the heating element is connected by the buck converter to the voltage source or if the heating element is disconnected by the buck converter from the voltage source. In addition, energy pulses which may appear on the grid when the heating element is disconnected or connected to the voltage source can be reduced by the buck converter. The buck converter makes the whole exhaust gas aftertreatment system more reliable and robust.

In some examples, the DC to DC converter is a multi-phase buck converter. A multi-phase buck converter is a DC to DC converter that includes multiple groups where each group has a switch with a corresponding inductance and where the groups are connected in parallel with respect to each other. With such a converter, it is possible to enhance the power and to regulate a stepless current flow. With the multi-phase buck converter, it is possible to control the power supply from the voltage source to the heating element in such a manner that the electric grid and the whole exhaust gas aftertreatment system are not harmed during connecting or disconnecting of the heating element from/to the voltage source. The multi-phase buck converter can be adjusted on the power requirements of the heating element so that especially during the on or off switching of the power supply from the voltage source to the heating element the electric grid does not face transient energy pulses. With the multi-phase buck converter, the power supply from the voltage source to the heating element can be realized in a very reliable and robust manner.

In some examples, the DC to DC converter is configured to control the electric power supply from the voltage source to the heating element during ramp-up and/or ramp-down process of the electric power supply from the voltage source to the heating element. In addition, the exhaust gas aftertreatment system includes a main switching element which is configured to control the electric power supply from the voltage source to the heating element after the ramp-up process and/or before the ramp-down process. The control unit may be configured to control the DC to DC converter and the main switching element based on the required electric power to heat the exhaust gas catalysis portion. The ramp-up process is the process or the phase during which the electric power supply to the heating element from the voltage source is enhanced from zero load to the required load. The ramp-down process is the process or the phase during which the electric power supply from the voltage source to the heating element is reduced from the required load to zero load. As such, the DC to DC converter is used to control electric power from the voltage source to the heating element during the ramp-up and/or during the ramp-down process. This means that the DC to DC converter is controlled by the control unit to enhance the electric power supplied from the voltage source to the heating element from zero load to the required load and that the DC to DC converter is controlled by the control unit to reduce the electric power supplied from the voltage source to the heating element from the required load to zero.

The main switching element is configured to control the electric power supply from the voltage source to the heating element after the ramp-up process and/or before the ramp-down process. This means that the main switching element is controlled by the control unit to control the electric power supply from the voltage source to the heating element after the ramp-up process and/or before the ramp-down process. In some examples, the main switching element is connected in parallel with respect to the DC to DC converter. If for example, the control unit controls the exhaust gas aftertreatment system to supply the heating element with electric power from the voltage source the control unit controls during the ramp-up process the DC to DC converter to supply the heating element with electric power from the voltage source and the control unit controls after the ramp-up process the main switching element to control the electric power supply from the voltage source to the heating element.

In some implementations, the main switching element is activated once the required electric power during the ramp-up process has reached 90% of its required load. Using the DC to DC converter during ramp-up and/or ramp-down process of the electric power supply from the voltage source to the heating element the electric power supply can be precisely controlled. This assures the stability of the electric grid of the exhaust gas aftertreatment system. Using the main switching element to control the electric power supply from the voltage source to the heating element after the ramp-up process and/or before the ramp-down process increases the efficiency of the overall circuit. With a configuration according to this example, the whole exhaust gas aftertreatment system and the circuit/grid are very reliable and robust even if the heating element is connected or disconnected from the voltage source.

In some implementations, the voltage source supplies the exhaust gas aftertreatment system with an electric voltage of at least 36 Volt, such as, with an electric voltage of 48 Volt. It is conceivable that hybrid vehicles are powered by an internal combustion engine and by an electrical engine. The electrical engine is supplied with electrical energy by a voltage source. It is conceivable that the voltage source which supplies the electric engine to drive the hybrid vehicle is also used to supply the heating element of the exhaust gas catalyst with electric power. If this is the case the number of voltage sources in such a vehicle can be reduced which reduces the overall costs of the vehicle. The voltage source which is configured to supply the electric engines to drive the vehicle conventionally supply them with an electric voltage of at least 36 Volt, for example, with an electric voltage of 48 Volt. Therefore, it is advantageous if the exhaust gas aftertreatment system is configured to handle the electric voltage of at least 36 Volt, for example, the electric voltage of 48 Volt. This helps to reduce the number of different parts and therefore to reduce the costs.

In some implementations, a method for controlling an exhaust gas aftertreatment system of an internal combustion engine is disclosed. The exhaust gas aftertreatment system includes an exhaust gas catalyst that includes an exhaust gas catalysis portion and a heating element. The exhaust gas aftertreatment system includes a voltage source supplying the heating element with electric power for heating the heating element. The exhaust gas aftertreatment system also includes a DC to DC converter and a main switching element. The DC to DC converter and the main switching element are configured to control the electric power supply from the voltage source to the heating element. The method includes the following steps: providing a signal, where the signal determines if the exhaust gas catalysis portion is to be heated by the heating element or not. The method also includes the following steps: controlling the DC to DC converter to control a ramp-up process of an electric power supply from the voltage source to the heating element based on the signal, and controlling the main switching element to control the electric power supply from the voltage source to the heating element after the ramp-up process and/or before a ramp-down process based on the signal. The method also includes the following steps: controlling the DC to DC converter to control the ramp-down process of the electric power supply from the voltage source to the heating element based on the signal.

If, for example, a sensor or a sensor arrangement in the exhaust gas aftertreatment system detects that the temperature of the exhaust gas catalysis portion is below a predetermined threshold value, for example after a cold start, a control unit, which is configured to detect, for example, by the sensor arrangement, that the temperature of the exhaust gas catalysis portion is below the predetermined threshold, the control unit can provide the signal according to which the heating element is to be heated. After that the DC to DC converter is controlled to enhance the electric power to the heating element from the voltage source. If the electric power has reached a predetermined level, for example 90% of the defined electric load, the main switching element is controlled to supply the electric power from the voltage source to the heating element. If, for example, the same sensor arrangement detects that the temperature of the exhaust gas catalysis portion is above the predetermined threshold, then the main switching element and the DC to DC converter are controlled to reduce the electric power supplied from the voltage source to the heating element from the predetermined load to for example 50% of the maximum load, for example 20% of the maximum load or to zero load. The maximum load is the maximum electric load which can be handled by the heating element.

The DC to DC converter is also used during this ramp-down process. The described method makes it possible to control the electric power supply from the voltage source to the heating element during the ramp-up and the ramp-down process precisely and in addition to ensure the stability of the grid. Therefore, the method to control the exhaust gas aftertreatment system is very reliable and robust.

In some implementations, a device for controlling an exhaust gas aftertreatment system of an internal combustion engine includes a control unit which is configured to control the described method.

In some examples, a computer program product includes instructions which, when the program is executed by a computer, causes the computer to carry out steps of the pre-described method.

The device for controlling an exhaust gas aftertreatment system is for example an engine control unit. In some examples, the device is part of the engine control unit or that the device is an additional control unit which is arranged in the vehicle with the internal combustion engine. The computer program product may be executed in the engine control unit. In some examples, the computer program product is executed by the additional control unit which is arranged in the vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 shows a second diagram of a duty cycle of the circuit according to FIG. 2.

FIG. 5 shows a third diagram of a duty cycle of the circuit of FIG. 2.

Like reference symbols in the various drawings indicate like elements.

DETAILED DESCRIPTION

Figure 1:
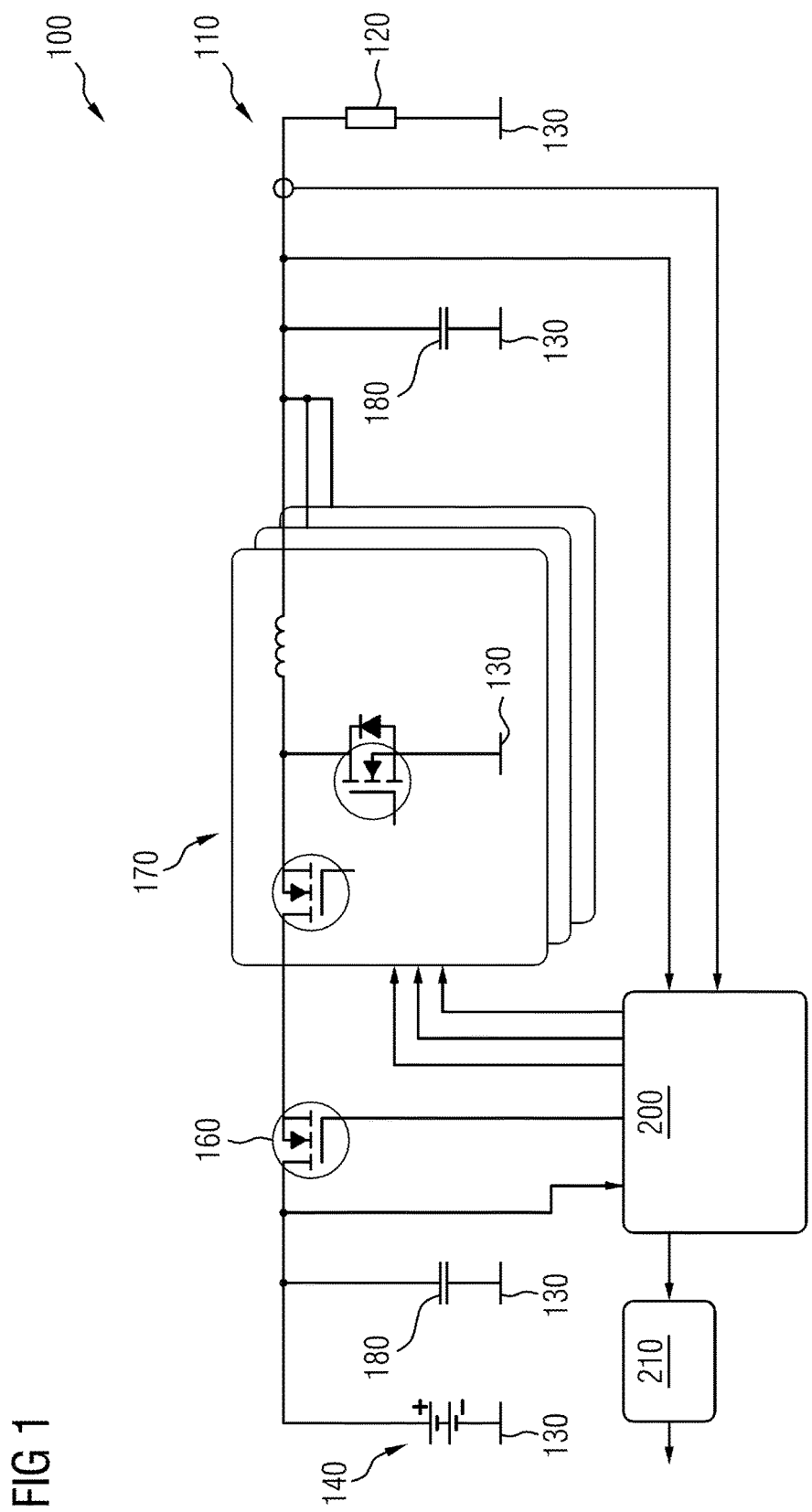
FIG. 1 shows a schematic view of an exemplary circuit of the exhaust gas aftertreatment system according to a first exemplary example.

FIG. 1 shows a schematic, first circuit of an exhaust gas aftertreatment system 100. The exhaust gas aftertreatment system 100 includes an exhaust gas catalyst 110 where the exhaust gas catalyst 110 includes a heating element 120 and an exhaust gas catalysis portion. The heating element 120 is configured to heat the exhaust gas catalysis portion. The exhaust gas aftertreatment system 100 further includes a voltage source 140. The voltage source 140 is configured to supply the heating element 120 with electric power. As shown, the exhaust gas aftertreatment system 100 further includes a redundancy switching element 160. The redundancy switching element 160 may be arranged to provide an additional shut-off path.

The exhaust gas aftertreatment system 100 further includes a DC to DC converter 170. The DC to DC converter 170 is configured to control the electric power supply from the voltage source 140 to the heating element 120. The exhaust gas aftertreatment system 100 may include capacitors 180. The capacitors 180 are arranged to smooth out ripple current and smooth DC voltage variations.

The exhaust gas aftertreatment system 100 includes, in addition, a control unit 200 and a communication unit 210. The control unit 200 is configured to control the DC to DC converter 170 based on the required electric power to heat the exhaust gas catalysis portion of the exhaust gas catalyst 110. The communication unit 210 is configured to communicate with other parts of a vehicle if the exhaust gas aftertreatment system is arranged in the vehicle. The DC to DC converter 170 may be a three phase buck converter. The three phases of the DC to DC converter 170 are controlled by the control unit 200. This is schematically illustrated in FIG. 1 by three arrows which go from the control unit 200 to the DC to DC converter 170. The DC to DC converter 170 is used during the ramp-up process of the electric power supply from the voltage source 140 to the heating element 120, during the steady state power supply from the voltage source 140 to the heating element 120 and during the ramp-down process of the electric power supply from the voltage source 140 to the heating element 120. In some examples, the whole power supply is controlled by the DC to DC converter. The voltage source 140, the capacitors 180, the DC to DC converter and the heating element 120 may be connected to an engine ground 130.

Figure 2:
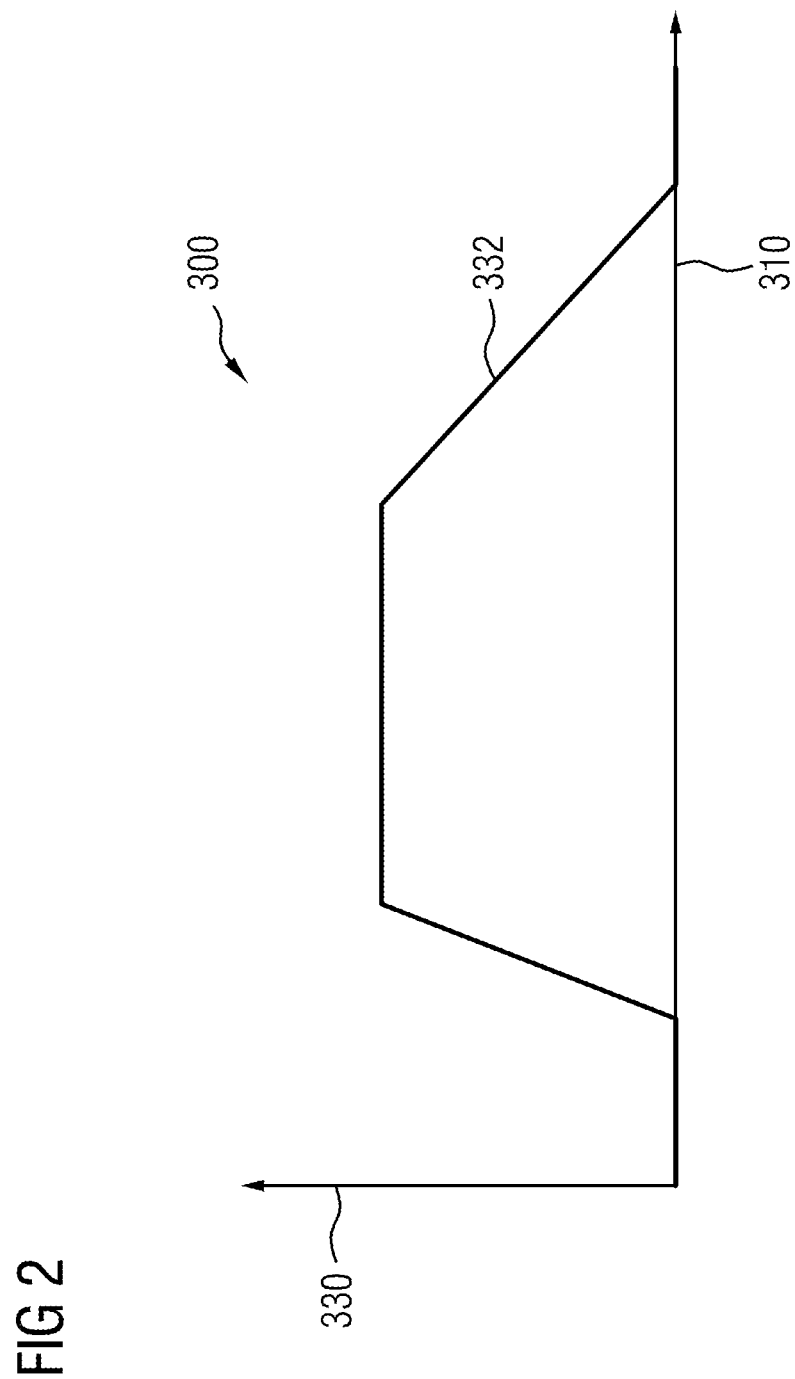
FIG. 2 shows a first diagram of an exemplary duty cycle of the circuit according to FIG. 1.

A duty cycle of the above described example can be seen in FIG. 2. FIG. 2 shows schematically as first diagram 300 which shows the current 330 flowing from the voltage source 140 to the heating element 120 over time 310. During a first time period, the current flow from the voltage source 140 to the heating element 120 is zero until the ramp-up process is initiated. To initiate the power supply the control unit 200 controls the DC to DC converter 170 accordingly. This can be seen in the first diagram 300 where during a first time period a current course 332 from the voltage source 140 to the heating element 120 increases over time 310 from zero current to the required current. When the ramp-up process is completed, the current 330 flows from the voltage source 140 to the heating element 120 in a steady state mode or phase. This can be seen in the first diagram 300 where the current course 332 remains constant over time 310 during a second time period. During a third time period after the second time period the electric power supply from the voltage source 140 to the heating element 120 is reduced to zero. This can be seen in the first diagram 300 in the current course 332, wherein the current 330 supplied from the voltage source 140 to the heating element 120 is reduced to zero. This third time period is the ramp-down process. The whole duty cycle is controlled by the control unit 200 by means of the DC to DC converter 170.

Figure 3:
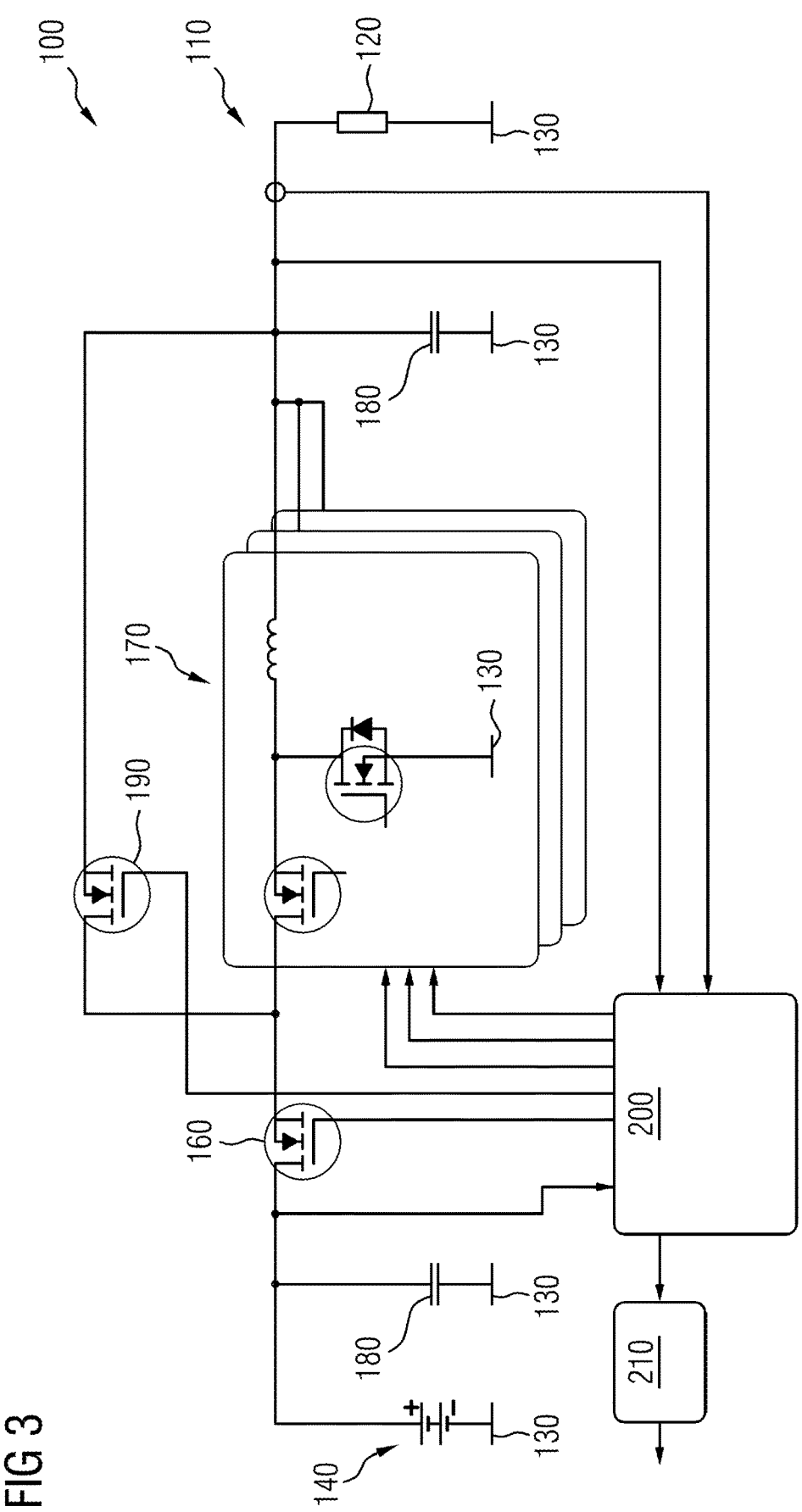
FIG. 3 shows a schematic view of an exemplary circuit of an exhaust gas aftertreatment system.

FIG. 3 shows in a schematic second example of a circuit of an exhaust gas aftertreatment system 100. The second example differs from the first example in that the exhaust gas aftertreatment 100 includes in addition a main switching element 190. The main switching element 190 is configured to control the electric power supply from the voltage source 140 to the heating element 120 after the ramp-up process and/or before the ramp-down process, for example during the steady state power supply from the voltage source 140 to the heating element 120. The control unit 200 of the second example of the exhaust gas aftertreatment system 100 is therefore in addition also configured to control the main switching element 190.

FIG. 4 shows in a second diagram 301 the current flow over the DC to DC converter 170 of the second example of the exhaust gas aftertreatment system 100 during a duty cycle.

FIG. 5 shows in a third diagram 302 the current flow over the main switching element 190 of the second example of the exhaust gas aftertreatment system 100 during a duty cycle.

As it can be seen in the FIGS. 4 and 5, the DC to DC converter 170 is used during the ramp-up process to increase the power supply from the voltage source 140 to the heating element 120 and during the ramp-down process of the energy supply from the voltage source 140 to the heating element 120. As it can be seen in FIG. 5 the main switching element is used to control the power supply from the voltage source 140 to the main switching element 120 after the ramp-up process and before the ramp-down process, therefore during the steady state of the power supply.

The control unit 200 of the second example of the exhaust gas aftertreatment system 100 is configured to control the power supply from the voltage source 140 to the heating element 120 during the ramp-up process via the DC to DC converter 170 and to switch from the DC to DC converter 170 to the main switching element 190 after the ramp-up process or after a predefined part of the ramp-up process, for example 90% or 75% of the ramp-up process. The control unit 200 is additionally configured to control the electric power supply from the voltage source 140 to the heating element 120 via the main switching element 190. The control unit 200 is in addition configured to change the electric power supply from the main switching element 190 to the DC to DC converter 170 during the ramp-down process. So that the ramp-down process the electric power supply from the voltage source 140 to the heating element 120 is controlled by the DC to DC converter 170.

A number of implementations have been described. Nevertheless, it will be understood that various modifications may be made without departing from the spirit and scope of the disclosure. Accordingly, other implementations are within the scope of the following claims.

What is claimed is:

1. An exhaust gas aftertreatment system for treating exhaust gas from an internal combustion engine, the exhaust gas aftertreatment system comprises:
    an exhaust gas catalyst including an exhaust gas catalysis portion and a heating element, wherein the heating element is configured to heat the exhaust gas catalysis portion;
    a voltage source which supplies the heating element with electric power for heating the heating element;
    a DC to DC converter directly connected to the heating element and being configured to control an electric power supply from the voltage source to the heating element during ramp-up and/or ramp-down process of the electric power supply;
    a main switching element directly connected to the heating element in parallel to the DC to DC converter which is configured to control the electric power supply from the voltage source to the heating element after the ramp-up process and/or before the ramp-down process; and
    a control unit in communication with the DC to DC converter and the main switching element, being configured to control the DC to DC converter and the main switching element based on a signal according to which the heating element is to be heated and the required electric power to heat the exhaust gas catalysis portion.

2. The exhaust gas aftertreatment system of claim 1, wherein the DC to DC converter is a buck converter.

3. The exhaust gas aftertreatment system of claim 2, wherein the DC to DC converter is a multi-phase buck converter.

4. The exhaust gas aftertreatment system of claim 1, wherein the DC to DC converter is configured to control the electric power supply from the voltage source to the heating element during ramp-up and/or ramp-down process of the electric power supply from the voltage source to the heating element, and
    wherein the exhaust gas aftertreatment system comprises a main switching element which is configured to control the electric power supply from the voltage source to the heating element after the ramp-up process and/or before the ramp-down process, and
    wherein the control unit is configured to control the DC to DC converter and the main switching element based on the required electric power to heat the exhaust gas catalysis portion.

5. The exhaust gas aftertreatment system of claim 1, wherein the voltage source supplies the exhaust gas aftertreatment system with an electric voltage of at least 36 Volt.

6. The exhaust gas aftertreatment system of claim 5, wherein the electric voltage is 48 Volt.

7. A method for controlling an exhaust gas aftertreatment system of an internal combustion engine, the exhaust gas aftertreatment system comprises an exhaust gas catalyst having an exhaust gas catalysis portion and a heating element, the exhaust gas aftertreatment system includes a voltage source, wherein the voltage source supplies the heating element with electric power for heating the heating element, a DC to DC converter and a main switching element, each directly connected to the heating element in parallel to each other and a control unit in communication with the DC to DC converter and the main switching element, the control unit being configured to control the DC to DC converter and the main switching element to control an electric power supply from the voltage source to the heating element, wherein the method comprises:
    providing a signal at the control unit, the signal determining if the exhaust gas catalysis portion is to be heated by the heating element or not;
    controlling, at the control unit, the DC to DC converter to control a ramp-up process of an electric power supply from the voltage source to the heating element based on the signal;
    controlling, at the control unit, the main switching element to control the electric power supply from the voltage source to the heating element after the ramp-up process and/or before a ramp-down process based on the signal; and
    controlling, at the control unit, the DC to DC converter to control the ramp-down process of the electric power supply from the voltage source to the heating element based on the signal.

8. The method according to claim 7, wherein the DC to DC converter is a buck converter.

9. The method according to claim 8, wherein the DC to DC converter is a multi-phase buck converter.

10. A device for controlling an exhaust gas aftertreatment system of an internal combustion engine, where the device comprises a control unit, which is configured to perform the method according to claim 7.

* * * * *